R. M. WARREN.
ELECTRIC GENERATOR.
APPLICATION FILED APR. 21, 1917.

1,274,115.

Patented July 30, 1918.
2 SHEETS—SHEET 1.

Witnesses

Inventor
Robert M. Warren
By H. R. Van Deventer
Attorney

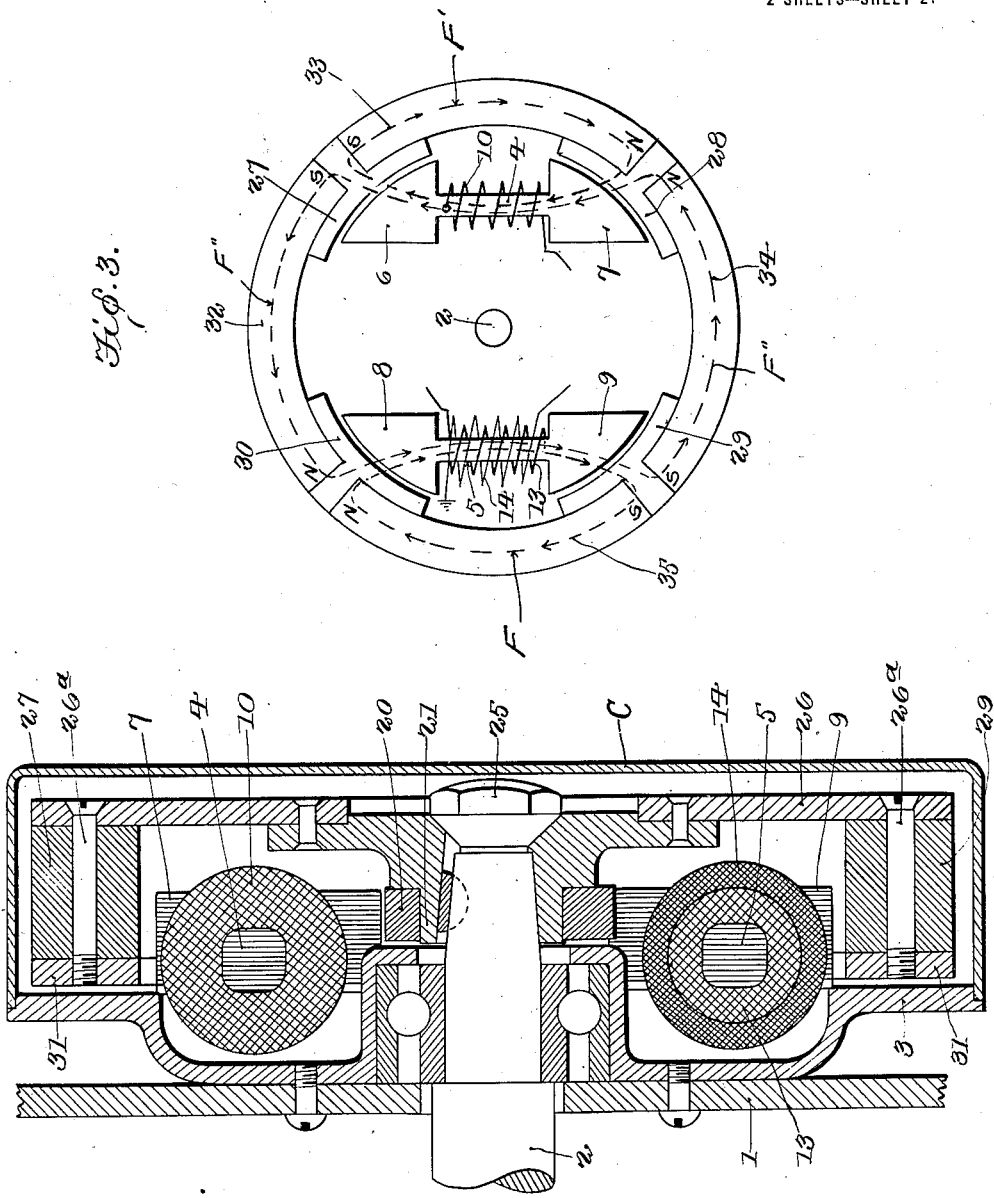

UNITED STATES PATENT OFFICE.

ROBERT MACK WARREN, OF SUMTER, SOUTH CAROLINA, ASSIGNOR TO SPLITDORF ELECTRICAL COMPANY, OF NEWARK, NEW JERSEY, A CORPORATION OF NEW JERSEY.

ELECTRIC GENERATOR.

1,274,115.   Specification of Letters Patent.   Patented July 30, 1918.

Application filed April 21, 1917. Serial No. 163,584.

*To all whom it may concern:*

Be it known that I, ROBERT M. WARREN, a citizen of the United States, residing at Sumter, in the county of Sumter and State of South Carolina, have invented certain new and useful Improvements in Electric Generators, of which the following is a specification, reference being had to the accompanying drawing.

The invention relates to new and useful improvements in electric generators and more particularly to an electric generator which is formed as a part of the fly wheel of an engine.

An object of the invention is to provide an electric generator which may be used at the same time for generating both ignition current and lighting current, and wherein the flux receiving members carrying the windings for the ignition current and the winding for the lighting current are so arranged as to complete independent flux paths between the poles of the magnet or magnets supplying the flux.

A further object of the invention is to provide an electric generator of the above character wherein the flux receiving members are stationary and located within a rotating magnet formed as a part of the fly wheel of an engine.

A still further object of the invention is to provide an electric generator of the above character wherein the rotating magnet is formed of segments arranged end to end and spaced from each other and wherein each pole piece for the sections of the magnet is provided with a projecting portion extending into and filling the space between the adjacent ends of the sections of the magnet.

These and other objects will in part be obvious and will in part be hereinafter more fully disclosed.

In the drawings which show by way of illustration one embodiment of the invention, Figure 1 is a sectional view through an electric generator embodying my improvements, said section being taken in the plane intersecting the axis of rotation of the magnet.

Fig. 2 is a sectional view on the line a—a of Fig. 1.

Fig. 3 is a view showing more or less diagrammatically the rotating magnet, the flux receiving members, and the independent paths of flux through said flux receiving members at the time of current generation.

Figure 1:
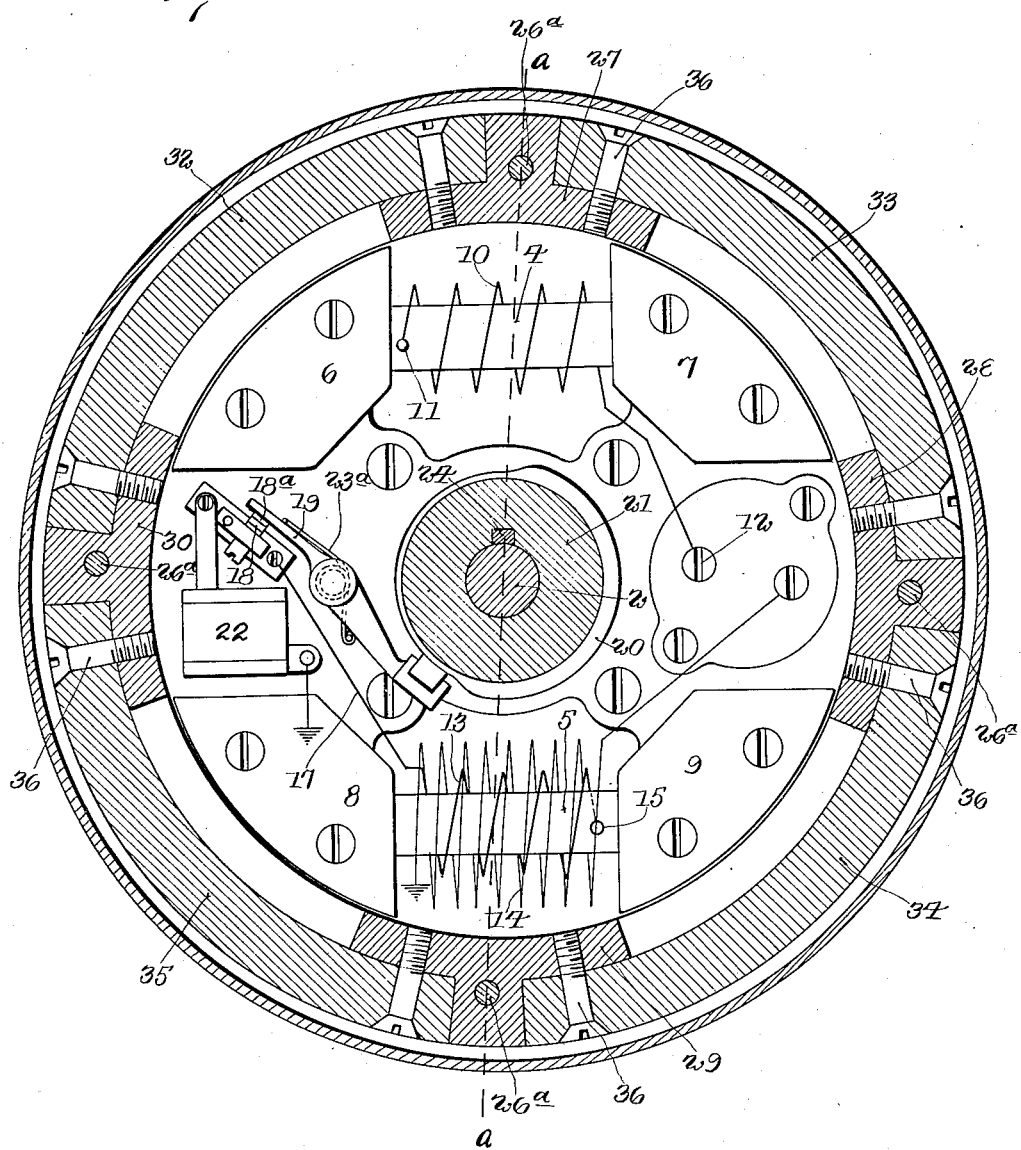

The electric generator consists broadly of a rotating magnet which is circular in form and preferably formed in sections. This rotating magnet is mounted between non-magnetic plates which are secured to and rotated with the engine shaft so that the circular magnet is rotated with the engine. This circular magnet is provided with a plurality of pole pieces, preferably four, with their centers arranged at substantially ninety degrees apart. Coöperating with the rotating magnet are two or more flux receiving members formed of suitable laminations carrying pole shoes. One of the flux receiving members is provided with a coil suitably connected and arranged so that the current generated therein may be used for lighting purposes. The other flux receiving member is provided with primary and secondary coils, the secondary coil being connected through suitable devices so that the current generated therein may be used for ignition purposes while the circuit including the primary coil is provided with an interrupter timed so as to break the primary circuit at proper intervals for ignition. These flux receiving members are so constructed and arranged as to complete independent flux paths between the poles of the magnet so that the current generating coil may be generating and furnishing lighting current even when the primary circuit of the ignition coils is interrupted or broken.

Referring more in detail to the drawings, my improved electric generator consists of a back plate 3 which is fixed to the engine frame 1 by suitable screws. Mounted on this back plate are laminations forming independent cores or flux receiving members 4 and 5. The core 4 is provided with pole shoes 6 and 7 while the core 5 is provided with pole shoes 8 and 9. Extending about the core or lamination 4 is a suitable winding 10 one end of which is connected to the core at 11 and thus grounded through the frame. The other end of this winding is connected with the terminal 12 insulated from the back plate and from this terminal of said winding connection is taken to a suitable lighting circuit such, for example, as the headlight of a motorcycle. Mounted on the core or lamination 5 is a suitable primary winding 13 and a secondary winding 14. These windings constitute the usual high tension ignition winding. One end of the primary winding is connected to the core at 15 and through the supporting frame for the core this end of the primary winding is grounded. The other end of the primary is connected to an interrupter which is of the usual construction. As indicated in the drawings, the primary is connected to the interrupter through the line 17 which is connected to an insulated contact point 18. A movable lever 19 is adapted to coöperate with a cam 20 mounted upon and movable with the hub 21 of the electric generator. The lever 19 is pivoted at 23 to the back plate 3 and carries a movable contact 18ª which coöperates with the fixed contact 18. A condenser indicated at 22 in Fig. 1 of the drawings is connected with the insulated contact 18 of the interrupter mechanism and is grounded through the frame so that said condenser is connected across the contacts. A spring 23ª is wrapped about the fulcrum post for the lever 19 and normally operates to press the movable contact toward the fixed contact. The cam 20 operates to separate the contacts. One terminal of the secondary winding is connected to the frame and through the frame is grounded while the remaining end of the secondary is connected with a terminal mounted upon but insulated from the back plate 3. Connection is made between this terminal 16 and the spark plug of the engine.

From the above it will be noted that the generating coils and flux receiving members are stationary. Associated with these flux receiving members is a rotating magnet which rotates about the pole shoes forming a part of the flux receiving members. The hub 21 above referred to is secured to the shaft 2 of the engine in any suitable manner, such as by a key 24 and a nut 25. Attached to this rotating hub is a non-magnetic disk 26. Pole pieces 27, 28, 29 and 30 are secured to this non-magnetic disk 26 by suitable clamping bolts 26ª. Each pole piece has an outwardly projecting part and the clamping bolt 26ª extends through this projecting part. A non-magnetic back plate 31 is also secured to these pole pieces, the securing bolts passing through or into this back plate. This back plate is in the form of a ring the inner edge of which terminates at the inner face of the pole pieces 27, 28, 29 and 30. Secured to the pole pieces and to the members 26 and 31 are magnets 32, 33, 34 and 35. These magnets are each in the form of a segment of a circle and together form in effect a single circular magnet. The projecting portion of each pole piece extends between the adjacent ends of the sections of the magnet to which it is attached, and this projecting part of the pole piece fills the space between the ends of the adjacent magnet sections. It will thus be seen that the projecting part of the pole piece may be readily shaped to fill this space while it would be more or less difficult to shape the ends of the sections of the magnet so that they would lie close together. The sections of the rotating magnet are secured to the pole pieces by suitable screws 36.

It is well understood that in a circular magnet having an even number of segments the adjacent ends of two magnet sections will be north poles while the next two adjacent ends in succession will be south poles, etc.

In Fig. 3 of the drawing, I have shown diagrammatically the path of flux from the magnet section 35 through the core 5 and the winding carried thereby. This is indicated by the broken line F and the direction of flow of the flux is indicated by the arrow heads in the line. I have also shown in this figure by the broken line F' the flow of magnetic flux from the magnet 33 and have indicated the direction of flow by the arrow heads in the line. I have further shown by the line F'' the flow of magnetic flux from the magnets 32 and 34. While the flow of flux through the cores from these two magnets is, of course, much less than the flow of flux from the magnets which operate substantially independently on the respective cores, still whatever flow there may be the flux from the magnets 32 and 34 will augment the flux from the magnets 33 and 35 respectively. The current generated in the coils on the respective cores will be so influenced by the magnets 33 and 35 respectively that any breaking of the primary circuit on the core 5 will not influence appreciably the current generated in the coil on the core 4. By this arrangement, therefore, I am able to use the generating coil 10 on the core 4 as a coil for generating lighting current while the generating coil on the core 5 may be used for generating current for ignition purposes.

When the magnetic poles are in the position shown in Fig. 1, the path of flux may be from the pole piece 27 to the pole piece 28, from the pole piece 29 to the pole piece 28, from the pole piece 27 to the pole piece 30 and from the pole piece 29 to the pole piece 30. In other words, the pole pieces of the ring magnet are all short circuited. At no time can this magnet stop in such a position that an open magnetic circuit exists.

The entire rotating magnet and the parts supporting the same may be inclosed in a casing indicated at C which will be clamped to the back plate 3 by suitable means. This inclosing casing, however, forms no part of the present invention. The back plate 3 is provided with a socket to receive a ball bearing in which the engine shaft rotates.

It is obvious that minor changes in the details of construction may be made without departing from the spirit of the invention set forth in the appended claims.

Having thus described my invention, what I claim as new and desire to secure by Letters Patent is:

1. An electric generator comprising a rotating shaft, a circular magnet carried thereby and disposed concentric to the axis of said shaft, said magnet having an even number of equally spaced pole pieces, two stationary parallel flux receiving members arranged at opposite sides of the center of rotation of said circular magnet, each of which is provided with pole shoes the centers of which are spaced substantially the same distance apart as the centers of the adjacent pole pieces of the magnet, said flux receiving members being symmetrically disposed relative to the axis of the shaft and simultaneously coöperating with the magnet pole pieces, a winding for one of said flux receiving members for generating a lighting current, primary and secondary windings for the other flux receiving member for generating ignition current and an interrupter coöperating with the last named windings.

2. An electric generator comprising a rotating shaft, a circular magnet carried thereby and concentric to the axis of said shaft, said magnet having equally spaced pole pieces with their centers arranged at 90° apart, two stationary parallel flux receiving cores arranged at opposite sides of the center of rotation of the circular magnet and each of which is provided with pole shoes, the centers of which are spaced substantially 90° apart, said cores being symmetrically disposed relative to the axis of the shaft and simultaneously coöperating with the pole pieces of the magnet, a winding for one of said cores for producing lighting current, primary and secondary windings for the other core for producing ignition current and an interrupter for the primary winding.

3. An electric generator including, in combination, a fixed flux receiving member, a generating coil carried thereby, a rotatable hub, a non-magnetic plate secured to said hub, spaced pole pieces secured to said non-magnetic plate, and segmental magnets extending between adjacent pole pieces and connected thereto whereby a circular magnet is formed, each pole piece having an outwardly projecting portion extending into and filling the space between the ends of the magnet section to which it is secured.

4. An electric generator including, in combination, a relatively stationary flux receiving member having a generating winding thereon, a rotatable hub, a non-magnetic plate carried by the hub, pole pieces secured to said non-magnetic plate, magnet sections arranged end to end with their ends spaced and overlapping and secured to the pole pieces, said pole pieces having outwardly projecting portions extending between and filling the space between the ends of the sections of the magnets.

In testimony whereof I hereunto affix my signature.

ROBERT MACK WARREN.